(12) United States Patent
Huber

(10) Patent No.: US 6,634,844 B2
(45) Date of Patent: Oct. 21, 2003

(54) PANEL FASTENER ASSEMBLY

(76) Inventor: Bryan J. Huber, P.O. Box 1457, 48238 E. First St., Oakridge, OR (US) 97483

( * ) Notice: Subject to any disclaimer, the term of this patent is extended or adjusted under 35 U.S.C. 154(b) by 0 days.

(21) Appl. No.: 09/887,788

(22) Filed: Jun. 22, 2001

(65) Prior Publication Data

US 2002/0197134 A1 Dec. 26, 2002

(51) Int. Cl.⁷ .................................................. F16B 21/00
(52) U.S. Cl. ......................................... 411/551; 411/552
(58) Field of Search ................................. 411/349, 350, 411/550, 551, 552, 910

(56) References Cited

U.S. PATENT DOCUMENTS

| | | | | |
|---|---|---|---|---|
| 2,378,638 A | * | 6/1945 | Johnson | |
| 2,385,180 A | | 9/1945 | Allen | ............... 24/221 |
| 2,478,972 A | * | 8/1949 | Luce | |
| 2,486,412 A | | 11/1949 | Huelster | ............... 24/221 |
| 2,486,670 A | * | 11/1949 | Nigg | |
| 2,533,115 A | * | 12/1950 | Huelster | |
| 2,882,580 A | * | 4/1959 | Barsalou | |
| 4,742,702 A | * | 5/1988 | Swertz | |

* cited by examiner

*Primary Examiner*—Flemming Saether
(74) *Attorney, Agent, or Firm*—Tarolli, Sundheim, Covell & Tummino L.L.P.

(57) ABSTRACT

The present invention is a fastener assembly, and a system including two panels secured together by the fastener. The panels may form part of a container with two portions secured together by the fastener, such as a door and a panel to which the door is hingedly connected. The container may have walls that are formed of a composite material with a metal edge channel. The fastener is suitable for joining panels that are relatively thick, such as those formed of a composite material. The fastener includes a screw rotatable in a body to move a crossbar into engagement with one portion of the container to clamp that portion to another portion of the container. The fastener is tamper resistant and operable completely from the exterior, without need to access the inside end of the fastener.

14 Claims, 5 Drawing Sheets

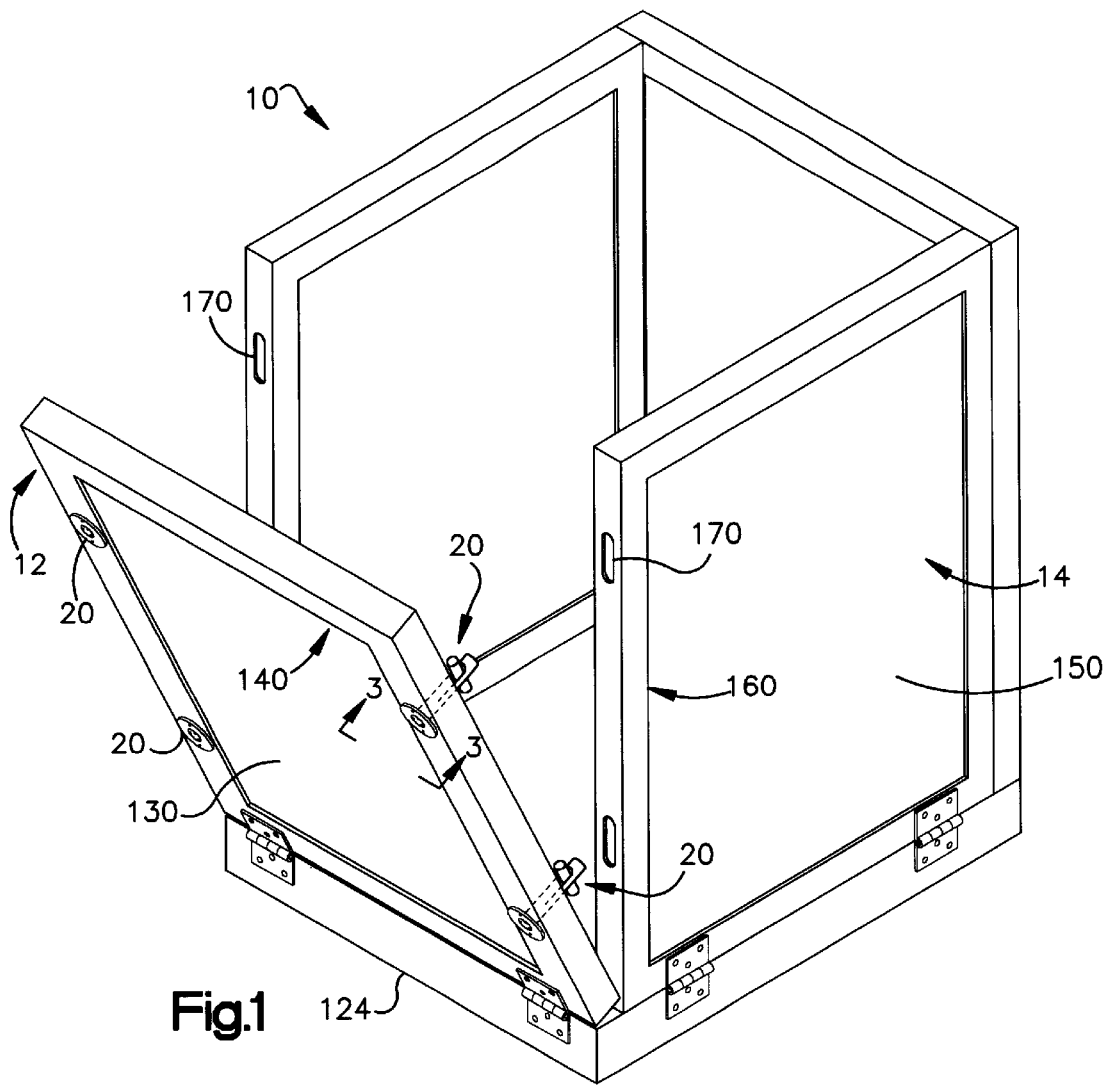
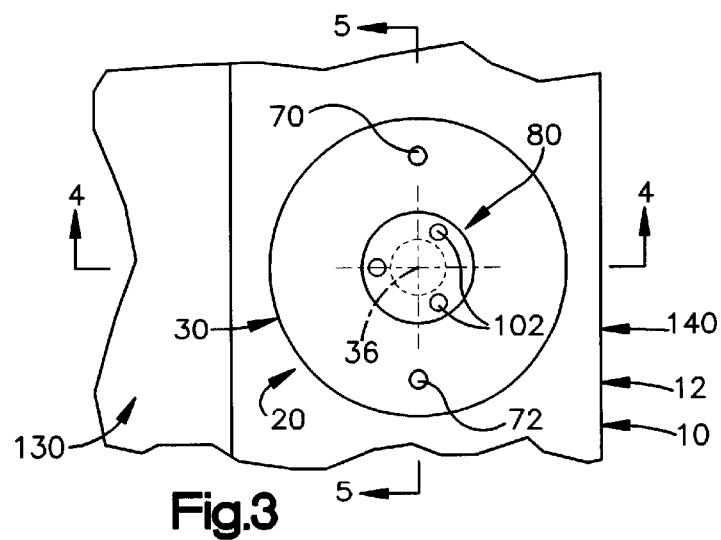

PANEL FASTENER ASSEMBLY

BACKGROUND OF THE INVENTION

1. Technical Field

The present invention relates to a fastener assembly, and more specifically to a fastener that releasably secures together two panels, such as portions of a container.

2. Description of Related Art

U.S. Pat. No. 2,478,972 discloses a cowl fastener stud in which radial arms are fixed in an internally threaded sleeve. The arms/sleeve assembly is movable axially but not rotationally in slots in a shank with a head. A screw is threaded into the sleeve and is rotatable in the shank. Upon rotation of the screw, the sleeve and radial arms move axially relative to the shank. The radial arms engage underneath a socket in one plate and cooperate with the head of the shank to clamp the one plate with another plate. A spring biases the sleeve and radial arms away from the head of the shank.

U.S. Pat. No. 2,486,670 discloses a cowl fastener stud in which radial arms are formed as one piece with an internally threaded nut.

U.S. Pat. No. 2,385,180 discloses a fastener in which radial arms are formed as part of a nut.

U.S. Pat. No. 2,486,412 discloses a fastener in which radial arms are formed as part of a nut. A sleeve has slots that do not extend all the way to the end. This prevents the ends of the shank from spreading apart.

SUMMARY OF THE INVENTION

The present invention is a fastener assembly, and a system including two panels secured together by the fastener. The panels may form part of a container with two portions secured together by the fastener, such as a door and a panel to which the door is hingedly connected. The container may have walls that are formed of a composite material with a metal edge channel. The fastener is suitable for joining panels that are relatively thick, such as those formed of a composite material. The fastener includes a screw rotatable in a body to move a crossbar into engagement with one portion of the container to clamp that portion to another portion of the container. The fastener is tamper resistant and operable completely from the exterior, without need to access the inside end of the fastener.

BRIEF DESCRIPTION OF THE DRAWINGS

Further features and advantages of the present invention will become apparent to those skilled in the art to which the present invention relates from a reading of the following detailed description with reference to the accompanying drawings, in which:

FIG. 1 is an illustration of a container including a plurality of fasteners constructed in accordance with the present invention, with the container in an open condition and a first panel of the container being shown pivoted open from a second panel of the container;

FIG. 3 is a top plan view of the fastener of FIG. 1, taken generally along line 3—3 of FIG. 1;

DETAILED DESCRIPTION OF THE INVENTION

Figure 2:
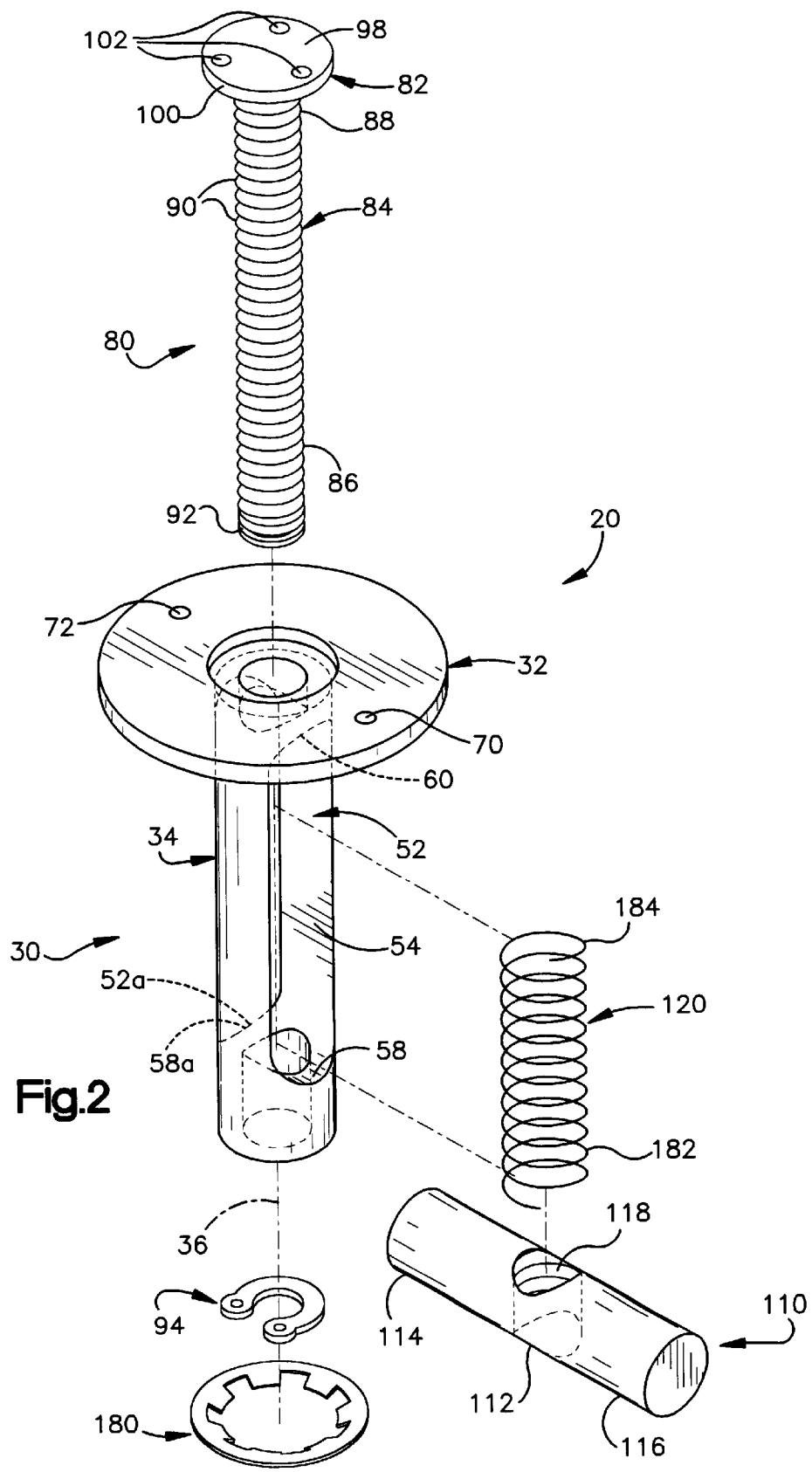
FIG. 2 is an enlarged view of the fastener of FIG. 1.

The present invention relates to a fastener system, and more specifically to a container having a fastener that releasably secures together two portions of the container, such as a door and a panel to which the door is hingedly connected. As representative of the present invention, FIG. 1 illustrates a container 10 that includes a plurality of identical fasteners 20 for fastening together two members or panels 12 and 14 of the container.

The fastener 20 (FIGS. 2–6) includes a body 30, a screw 80, a crossbar 110, and a spring 120. The body 30 is, preferably, formed as one piece from a material such as stainless steel. The body 30 has a head 32 and a sleeve wall 34. The sleeve wall 34 has a tubular cylindrical configuration centered on an axis 36. The sleeve wall 34 has parallel, cylindrical radially inner and outer side surfaces 38 and 40 centered on the axis 36.

The sleeve wall 34 has an axially outer end portion 42 adjacent the head 32 of the body 30, and an opposite axially inner end portion 44. The axially inner end portion 44 of the sleeve wall 34 has an annular, radially extending end surface or terminal end 46. (The terms axially "outer" and axially "inner" as used herein refer to the position or orientation of the fastener 20 when installed. The axially "outer end portion" is exposed for manipulation by a tool, and the axially "inner end portion", for example, is hidden inside the members 12 and 14 that are fastened together by the fastener 20.)

The radially inner surface 38 of the sleeve wall 34 defines a through hole 50 that extends for the entire length of the sleeve wall, to and through the axially inner end portion 44 of the sleeve wall and the axially inner end surface 46. The diameter of the through hole 50 is large enough so that the screw 80 fits into the through hole, as described below.

A pair of slots 52 and 52a are formed in the sleeve wall 34. The slots 52 and 52a are located diametrically opposite each other and are identical to each other. Thus, only the one slot 52 is described in detail or referred to, and the same reference numerals are used for corresponding parts of the other slot 52a, with the suffix "a" added.

The slot 52 has two planar side surfaces 54 and 56 that extend parallel to the axis 36. The distance 57 between the side surfaces 54 and 56 (the "width" of the slot) is larger than the diameter of the crossbar 110, so that the crossbar can, as described below, fit through the two slots across the through hole 50. The slots 52 and 52a do not extend to or through the axially inner end surface 46 of the sleeve wall 34 but instead terminate short of it.

Figure 6:
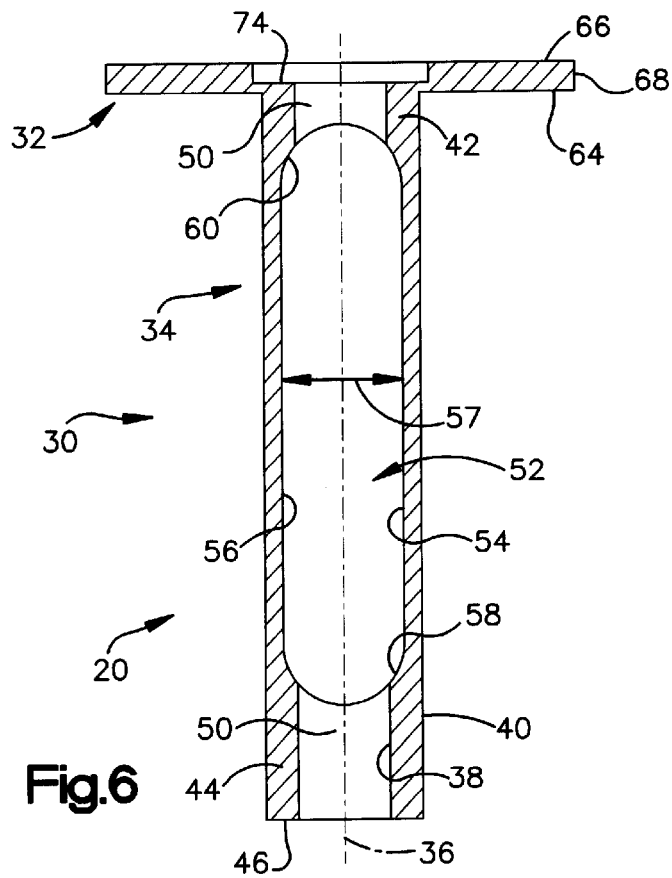
FIG. 6 is a sectional view of a body portion of the fastener of FIG. 1.

The axially inner end of the slot 50 may be formed by cutting with a circular tool, such as a drill bit, and the slot thus has an axially inner end surface 58 that appears circular when viewed in elevation as in FIG. 6. The slot 52 is larger in width than the diameter of the through hole 50. As a result, the axially inner end surface 58 of the slot 52 forms a shoulder surface that is not planar but instead has a three-dimensional configuration. The slot 52 also has an axially outer end surface 60 that is the mirror image of the axially inner end surface 58.

The head 32 of the fastener body 30 is disposed at the axially outer end portion 42 of the sleeve wall 34. The head 32 of the fastener body 30 has overall a flat, disc-shaped configuration extending radially outward from the axis 36.

The head 32 has parallel, annular axially inner and outer major side surfaces 64 and 66 between which extends a peripheral edge 68.

The axially outer side surface 66 is formed as an annular tool engagement surface and has two circular pin holes or pin openings 70 and 72. The two pin openings 70 and 72 are spaced apart diametrically about the axis 36, at the same radius from the axis. The two openings 70 and 72 are located near the peripheral edge 68 of the head 32.

The inner major side surface 64 of the head 32 of the body 30 merges with the cylindrical outer side surface 40 of the sleeve wall 34. A circular depression 74 is formed in the outer major side surface 66 of the head 32 of the body 30. The depression 34. The depression 74 is adapted to receive the head of the screw 80, as described below.

The screw 80 has a head 82 and a shank 84. The shank 84 has a cylindrical configuration centered on the axis 36 with an inner end portion 86 and an outer end portion 88. The shank 84 has an external thread 90 that extends for substantially the entire length of the shank. A retaining ring groove 92 is formed in the inner end portion 80 of the shank 84.

The head 82 of the screw 80 is disposed at the outer end portion 88 of the shank 84. The head 82 has a flat, disc-shaped configuration extending radially outward from the shank 84. The head 82 has parallel, circular, inner and outer major side surfaces 96 and 98 joined by an outer peripheral edge 100.

Three circular pin holes or pin openings 102 are formed in the outer major side surface 98 of the head 82 of the screw 80. The three pin openings 102 are spaced apart equally in a circular array centered on the axis 36, and are located near the outer peripheral edge 100 of the head 82.

The number and placement of the pin openings 70, 72 and 102 on the fastener 20 is unique, and thus makes the fastener not actuatable by any common tool, or otherwise known tool. In one exemplary embodiment, the head 32 of the fastener body 30 has a diameter of about 1.00 inches. The two pin openings 70 and 72 are each about 0.067 inches in diameter, and are located radially about 0.750 inches from the axis 36, 180 degrees apart about the axis. The head 82 of the screw 80 has a diameter of about 0.375 inches. The two pin openings 102 are each about 0.067 inches in diameter, and are located radially about 0.285 inches from the axis 36, 120 degrees apart about the axis. Of course, fasteners in accordance with the invention could have different dimensions.

The crossbar 110 has a cylindrical configuration including a central portion 112 that extends between first and second end portions 114 and 116. The radius of the crossbar 110 is substantially the same as, or slightly less than, the radius of the circular end surfaces 58 and 60 of the slot 50. The crossbar 110 could have a configuration other than cylindrical—for example, rectangular or square.

A cylindrical threaded opening 118 is formed in the crossbar 110 at the longitudinal center of the crossbar. The opening 118 is smaller in diameter than the crossbar 110 and extends diametrically through the crossbar. The threaded opening 118 in the crossbar is adapted to receive the externally threaded shank 84 of the screw 80.

The spring 120 is a circular compression spring that is larger in diameter than the shank 84 of the screw 80, but smaller in diameter than the through hole 50. In addition, the diameter of the spring 120 is less than the width 57 of the slot 52. The spring 120 is assembled in the fastener 20 in a manner described below.

The fastener 20 is illustrated as being used in connection with a container 10, to secure together a door 12 and a panel 14 to which the door is hingedly connected. It should be understood that the fastener 20 is usable in many other different applications. For example, the fastener 20 could be used to secure together two panels in a T-type configuration. The panels could be partition walls, for example.

The container 10, or box, has a base 124 and three side walls including the second panel 14. The first panel or door 12 is hingedly connected to the base 124 and forms the fourth side wall of the box 10. The box 10 also has a top wall or cover (not shown).

The drawings show two of the fasteners 10 that are used in securing one side of the door 12 to the first side wall 14. Other fasteners 10 are used in securing the other side of the door 12 to the second side wall. More or fewer fasteners 10 can be used.

The door panel 12 in the illustrated embodiment has a main body portion 130 that is formed as a composite material, including fiberglass skins 132 on a honeycomb core 134. The invention is usable with a door panel formed in any other manner. The door panel 12 in the illustrated box 10 is typically in the range of one half inch thick to one inch thick. The box 10 is about four feet by seven feet by four feet high, and is usable for transportation of military decontamination equipment, although it could have other dimensions and be used for different purposes.

The main body portion 130 has an edge portion 136. The edge portion 136 of the main body portion 130 of the door panel 12 is covered by a first channel 140. The first channel 140 is preferably made from a durable material, such as steel or aluminum. The first channel 140 has a U-shaped configuration including first and second side legs 142 and 144 and a central leg 146. The first and second side legs 142 and 144 of the first channel 140 have coaxial first and second fastener openings 147 and 148, respectively, of the container 10, and define between them a channel 149 that receives the edge portion 136.

The second panel 14 is of a similar construction to the first panel 12. The second panel 14 has a main body portion 150 that is formed as a composite material, including fiberglass skins 152 on a honeycomb core 154. The main body portion 150 has an edge portion 156.

The edge portion 156 of the second panel 14 is covered by a second channel 160, which may be similar in construction to the first channel 140. The second channel 160 has a U-shaped configuration including first and second side legs 162 and 164 and a central leg 166. A gasket material 167 (FIG. 5) may be provided, for example, on the channel 140.

The central leg 166 of the second channel 160 has an inner side surface 168. A third fastener opening 170 of the container 10 extends through the central leg 166 of the second channel 160, and through the inner side surface 168. The third fastener opening 170 is in the form of a slot that is long enough and wide enough to accommodate the crossbar 110. The slot 170 extends parallel to the first and second side legs 162 and 164 of the second channel 160.

The main body portion 150 of the second panel 14 has a turning cavity 172 disposed inward of the third fastener opening 170 and bounded outwardly by the inner side surface 168 of the central leg 166 of the second channel 160. The turning cavity 172 is formed by notching out or otherwise removing the composite material 154 of the edge portion 156 of the main body portion 150 of the second panel 14. The third fastener opening 170 extends from outside the second panel 14 into the turning cavity 172. The turning cavity 172 is large enough to permit insertion of the inner end portion 44 of the fastener body 30, and the crossbar 110, and subsequent rotation of the crossbar by ninety degrees about the axis 36.

The fastener 20 is assembled in the container 10 as follows. The body 30 of the fastener 20 is first inserted axially into the first fastener opening 147 in the first panel 12, through the channel 149. The inner major side surface 64 of the head 32 of the body 30 engages the first leg 142 of the first channel 140. This engagement blocks further movement of the fastener body 30 in an inward direction relative to the first panel 12.

An internally toothed retaining clip 180 is placed on the inner end portion 44 of the body 30, and moved axially outward until it engages the second leg 144 of the first channel 140. The retaining clip 180 blocks movement of the fastener body 30 in an outward direction relative to the first panel 12. As a result, the fastener body 30 is secured to the first panel 12. The inner end portion 44 of the fastener body 30 extends from the second fastener opening 148.

Next, the spring 120 is inserted laterally, not axially, into the open center of the fastener body 30, through one of the slots 52 or 52a. The spring 120 is positioned parallel to and centered on the axis 36. An inner end portion 182 of the spring 120 engages the inner shoulder surfaces 58 and 58a on the sleeve wall 34, adjacent the inner terminal end 46 of the body 30. An outer end portion 184 of the spring 120 engages the outer shoulder surfaces 60 and 60a on the sleeve wall 34, adjacent the head 32 of the body 30.

The spring 120 is then compressed enough to leave space for the crossbar 110 between the inner end portion 182 of the spring and the inner shoulder surfaces 58 and 58a on the sleeve wall 34. The crossbar 110 is inserted laterally between the spring 120 and the inner shoulder surfaces 60 and 60a of the body 30. The central portion 112 of the crossbar 110 is positioned in the interior of the fastener body 30. The end portions 114 and 116 of the crossbar 110 project radially from the slots 52a and 52, respectively, in the sleeve wall 34 of the body 30.

The spring 120 extends between the crossbar 110 at one end and the inner shoulder surfaces 58 and 58a at the other end. The spring 120 biases the crossbar 110 inwardly against the inner end surfaces 58 and 58a of the slots 52 and 52a. The side surfaces 54 and 56 of the slots block rotation of the crossbar 110 about the axis 30.

The screw 80 is then inserted axially into the body 30 through the head 32 and into the through hole 50 in the body. The threaded shank 84 of the screw 80 extends through the open center of the spring 120 until it engages the crossbar 110. The screw 80 is screwed into the threaded opening 118 in the crossbar 110.

The screw 80 is screwed into the crossbar 110 enough so that the inner end portion 86 of the screw, including the retaining ring groove 94, extends through and past the inner end portion 44 of the sleeve wall 34. The crossbar 110 is spaced axially from the second leg 144 of the first channel 140. The spring 120 circumscribes and extends along the threaded shank 84 of the screw 80.

Figure 7:
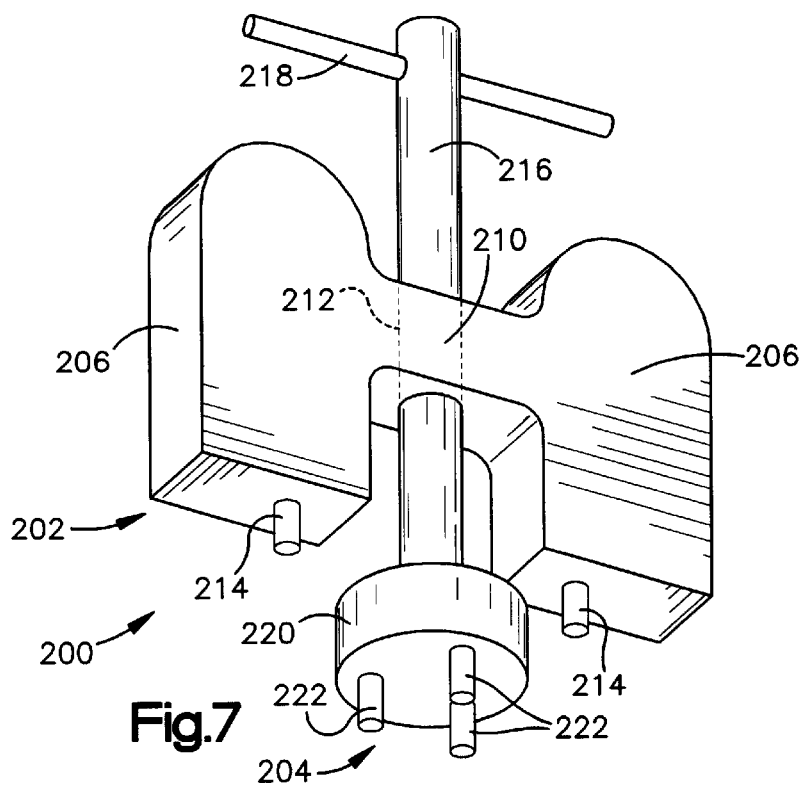
FIG. 7 is a perspective view of a tool used with the fastener of FIG. 1.

A special tool 200 (FIG. 7) is provided for use with the fastener 20. The tool 200 has a first part 202 for rotating the body 30 of the fastener 20 about the axis 36, and a second part 204 for rotating the screw 80 about the axis.

The first part 202 of the tool 200 has a paddle-shaped configuration including two side portions 206 joined by a central leg 210. The central leg 210 has an opening 212. Each one of the side portions 206 has a projecting pin 214. The pins 214 are spaced apart by the same distance as the pin openings 70 and 72 in the head 32 of the fastener body 30, on opposite sides of the axis 36. The pins 214 are adapted to be received in the pin openings 70 and 72 in the head 32 of the fastener body 30.

The second part 204 of the tool 200 includes an elongate post 216 that extends freely through the opening 212 in the central leg 210 of the first part 202. The second part 204 of the tool 200 is rotatable relative to the first part 202 and is movable axially relative to the first part.

A handle 218 is provided at one end of the post 216, extending at ninety degrees to the length of the post. A tablet-shaped turning portion 220 is provided at the other end of the post. The turning portion 220 has three projecting pins 222. The pins 222 are spaced apart in the same array as the pin openings 102 in the head 82 of the screw 80. The pins 222 are adapted to be received in the pin openings 102 in the head 82 of the screw 80.

The pins 214 and 222 are cylindrical in configuration. Thus, the pins 214 are not, individually or as a pair, shaped like any common tool, for example, a slot head screwdriver or a Phillips head screwdriver.

A screw retaining ring 94 is placed in the retaining ring groove 92. The retaining ring 94 blocks movement of the screw 80 in an outward direction relative to the body 30. At the same time, the head 82 of the screw 80 engages in the depression 74 in the head 32 of the body 30 and blocks inward movement of the screw 80 relative to the body 30. As a result, the screw 80 is fixed in position axially in the body 30. Therefore, when the screw 80 is rotated in the body 30, the crossbar 110 moves relative to the body 30, axially outward in the slots 52 and 52a, in a direction toward the head 32 of the body 30.

Figure 4:
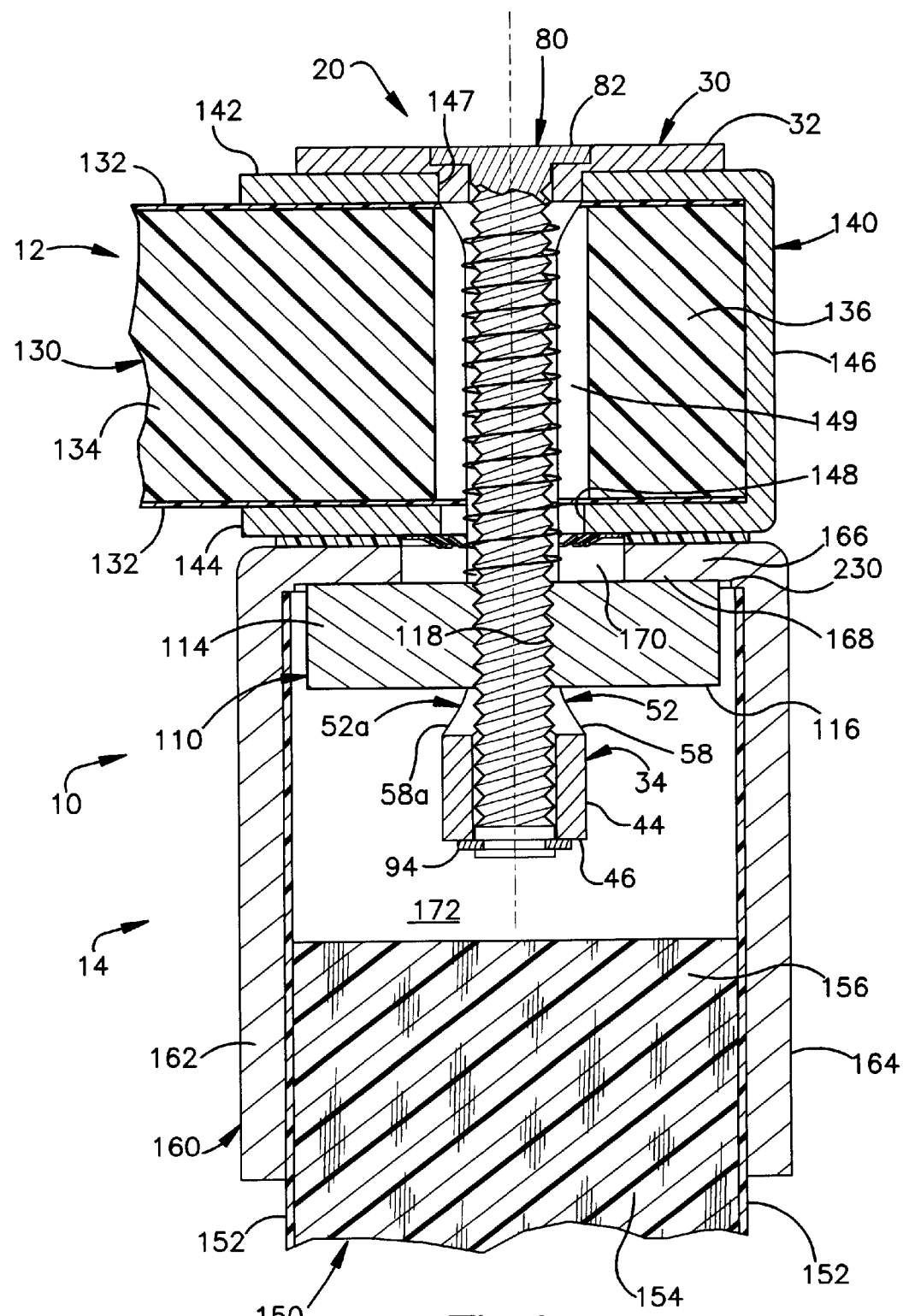
FIG. 4 is a sectional view showing the fastener in a locked condition in the container.
Figure 5:
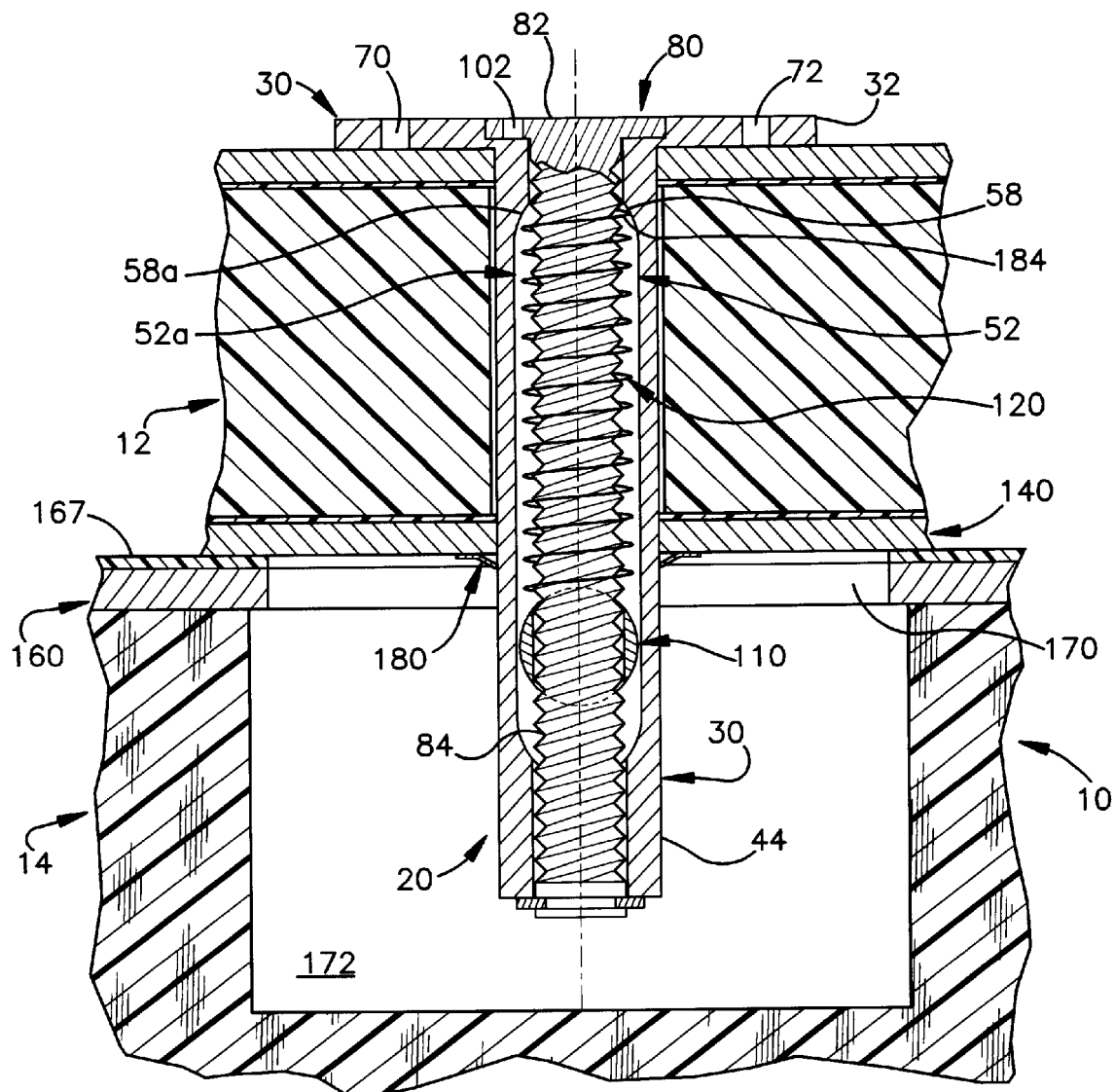
FIG. 5 is a sectional view taken at ninety degrees from FIG. 4.

The first panel 12 is then moved into position adjacent the second panel 14, as shown in FIGS. 4 and 5. The body 30 is rotated, to rotate the crossbar 110, so that the crossbar fits through the slot 170. This is done by aligning the two pin openings 70 and 72 in the body with the length of the slot 170. The pin openings 70 and 72 are on a line that extends parallel to the length of the crossbar 110 when the crossbar extends into the slots 52 and 52a. Therefore, aligning the pin openings 70 and 72 with the length of the slot 170 ensures that the crossbar 110 is in position to move through the slot.

The crossbar 110 and the inner end portion 44 of the body 30 are inserted through the slot 170 in the second channel 160, and into the turning cavity 172 in the second panel 14. The body 30 of the screw 80 is then rotated, using the first part 202 of the tool 200, so that the crossbar 110 extends at a ninety degree angle to the slot 170 and can not be pulled out of the slot. This is done by aligning the two pin openings 70 and 72 in the body at a ninety degree angle to the length of the first channel 140.

The screw 80 is then rotated relative to the body 30, using the second part 204 of the tool 200. The rotation of the screw 80 causes the end portions 114 and 116 of the crossbar 110 to move into engagement with and be drawn tight against the inner side surface 168 of the central leg 166 of the second channel 160. The crossbar 110 engages in an arcuate groove 230 in the channel 160. Further movement of the crossbar 110 is resisted by the engagement of the head 32 of the fastener body 30 with the first panel 12. As a result, the fastener 20 clamps the first panel 12 to the second side leg 164 of the second channel 160 on the second panel 14.

The fastener 20 thus secures the first panel 12 to the second panel 14. In this condition, the fastener 20 is tamper resistant, because the only exposed parts of the fastener are the body head 32 and the screw head 82. Those are moveable only with the unique tool 200 provided with the fastener 20.

Also, the retainer clip 180 prevents removal of the fastener body 30 from the first panel 12.

In addition, the fastener 20 is quite strong because the slots 52 and 52a do not extend all the way to the inner terminal end 46 of the body 30. This makes the sleeve wall 34 stronger and thus makes the fastener 20 stronger. Therefore, the fastener 20 is suitable for joining thicker panels, such as composite panels that are typically relatively thick. Also, because the fastener 20 is a "blind" type fastener, it is not necessary to reach around a panel edge or otherwise hold a nut or other fastener portion.

From the above description of the invention, those skilled in the art will perceive improvements, changes and modifications in the invention. Such improvements, changes and modifications within the skill of the art are intended to be covered by the appended claims.

Having described the invention, I claim:

1. A fastener comprising a body, a screw, a cross bar, and a spring;

said body including a head and a sleeve wall extending from said head and centered on an axis of said fastener;

said head of said body having a surface that is engagable with a structure to block inward movement of said body relative to said structure;

said sleeve wall having an outer end portion connected with said head of said body, said sleeve wall having a central portion extending from said outer end portion, said central portion having an axially extending central opening for receiving said screw therein, said sleeve wall having an inner end portion through which said central opening extends and which has an inner terminal end of said sleeve wall, said central portion of said sleeve wall having diametrically opposed slots communicating with said central opening, said central portion of said sleeve wall having slot end surfaces that define inner ends of said slots spaced axially from said inner terminal end of said sleeve wall, said central portion of said sleeve wall having slot end surfaces that define outer ends of said slots spaced axially from said head;

said screw being insertable into said body, said screw having a head for limiting inward movement of said screw into said body, said screw having a threaded shank extending through said central opening in said sleeve wall to a location disposed radially inward of said slots;

said cross bar having a central portion and first and second opposite end portions, said central portion of said cross bar having a threaded opening receiving said threaded shank of said screw, said first and second end portions of said cross bar projecting radially outward from said central opening in said sleeve wall through said slots in said sleeve wall, said sleeve wall having slot side surfaces engagable by said cross bar end portions to block rotation of said cross bar relative to said sleeve wall;

said screw being rotatable in said body and in said cross bar to effect axial movement of said cross bar in a direction toward said head of said screw and into a position in abutting engagement with the structure to limit outward movement of said cross bar and said screw relative to the structure; and said spring being disposed in said body, said spring being smaller in diameter than said slots in said sleeve wall, said spring being insertable laterally into said sleeve through one of said slots in said sleeve wall.

2. A fastener as set forth in claim 1 wherein said spring has an outer end portion that acts on said slot end surfaces that define outer ends of said slots and an inner end portion that acts on said cross bar.

3. A fastener as set forth in claim 1 wherein said body of said fastener is formed as one piece from metal.

4. A fastener as set forth in claim 1 wherein said head of said body has an annular, outwardly fading surface including at least two spaced apart pin openings which are engagable by pins on a first part of a tool;

said head of said screw having a circular, outwardly facing surface disposed radially inward of said annular surface of said head of said body and including at least two spaced apart pin openings which are engagable by pins on a second part of the tool to rotate said screw relative to said body while the pins on the first part of the tool engage pin openings on said head of said body.

5. A fastener as set forth in claim 4 wherein said screw has three pin openings disposed in a circular array and spaced apart by 120 degrees about said axis and said body has two pin openings disposed in a circular array and spaced apart by 180 degrees about said axis.

6. A fastener as set forth in claim 4 wherein a line between said two pin openings in said body extends parallel to said cross bar when said cross bar end portions project radially outward through said slots of said sleeve wall.

7. A fastener comprising a body, a screw, a cross bar, and a spring;

said body including a head and a sleeve wall extending from said head and centered on an axis of said fastener;

said head of said body having a surface that is engagable with a structure to block inward movement of said body relative to said structure;

said sleeve wall having an outer end portion connected with said head of said body, said sleeve wall having a central portion extending from said outer end portion, said central portion having an axially extending central opening for receiving said screw therein;

said central portion of said sleeve wall having diametrically opposed first and second slots communicating with said central opening;

said sleeve wall having an inner end portion through which said central opening extends and which has an inner terminal end of said sleeve wall;

said sleeve wall having a first pair of slot side surfaces that define axially extending sides of said first slot and a second pair of slot side surfaces that define axially extending sides of said second slot;

said sleeve wall having first and second arcuate slot end surfaces that define inner ends of said first and second slots, respectively, spaced axially inward from said head of said body;

the distance between each pair of slot side surfaces being greater than the diameter of said central opening, whereby said slot end surfaces form internal shoulder surfaces in said sleeve wall at the inner ends of said first and second slots, said screw being insertable into said body, said screw having a head for limiting inward movement of said screw into said body, said screw having a threaded shank extending through said central opening in said sleeve wall to a location disposed radially inward of said slots;

said cross bar having a central portion with a threaded opening receiving said threaded shank of said screw, said cross bar having first and second end portions projecting radially outward through said slots and engaging said slot side surfaces to block rotation of said cross bar relative to said sleeve wall;

said screw being rotatable in said body and in said cross bar to effect axial movement of said cross bar in a direction toward said head of said screw and into a position in abutting engagement with the structure to limit outward movement of said cross bar and said screw relative to the structure.

8. A fastener as set forth in claim 7 wherein said spring is disposed in said central opening in said sleeve wall, said spring having a diameter which is less than the distance between slot side surfaces of each pair of slot side surfaces.

9. A fastener as set forth in claim 8 wherein said spring has inner and outer end portions, said outer end portion of said spring acting on said slot end surfaces that define outer ends of said first and second slots, said spring inner end portion acting on said central portion of said cross bar.

10. A fastener as set forth in claim 7 wherein said body of said fastener is formed as one piece from metal.

11. A fastener as set forth in claim 7 further comprising a retaining ring on said inner end portion of said screw, said retaining ring engaging said terminal end of said sleeve wall to block axial movement of said screw outward of said body.

12. A fastener as set forth in claim 7 wherein said head of said body has an annular, outwardly facing surface including at least two spaced apart pin openings which are engagable by pins on a first part of a tool;

said head of said screw having a circular, outwardly facing surface disposed radially inward of said annular surface on said head on said body and including at least two spaced apart pin openings which are engagable by pins on a second part of the tool to rotate said screw relative to said body while the pins on the first part of the tool engage pin openings on said head of said body.

13. A fastener as set forth in claim 12 wherein said screw has three pin openings disposed in a circular array and spaced apart by 120 degrees about said axis and said body has two pin openings disposed in a circular array and spaced apart by 180 degrees about said axis.

14. A fastener as set forth in claim 12 wherein a line between said two pin openings in said body extends parallel to said cross bar when said cross bar end portions project radially outward through said slots of said sleeve wall.

* * * * *